United States Patent
Yanagidate

(10) Patent No.: US 7,869,552 B2
(45) Date of Patent: Jan. 11, 2011

(54) RECEIVING APPARATUS FOR PERFORMING FREQUENCY SYNCHRONIZATION USING SPECIFIC CODE PATTERN

(75) Inventor: Masaharu Yanagidate, Sagamihara (JP)

(73) Assignee: Olympus Corporation, Tokyo (JP)

( * ) Notice: Subject to any disclaimer, the term of this patent is extended or adjusted under 35 U.S.C. 154(b) by 953 days.

(21) Appl. No.: 11/727,218

(22) Filed: Mar. 26, 2007

(65) Prior Publication Data
US 2008/0107223 A1 May 8, 2008

(30) Foreign Application Priority Data
Nov. 8, 2006 (JP) ............... 2006-302625

(51) Int. Cl.
*H04L 7/06* (2006.01)
(52) U.S. Cl. ...................... 375/364; 375/365
(58) Field of Classification Search ................ 375/376, 375/359, 362, 364, 365, 368
See application file for complete search history.

(56) References Cited

U.S. PATENT DOCUMENTS

| | | | |
|---|---|---|---|
| 5,625,573 A | 4/1997 | Kim | |
| 6,219,333 B1 * | 4/2001 | Ahn | 370/203 |
| 7,054,088 B2 * | 5/2006 | Yamazaki et al. | 360/65 |
| 2004/0170239 A1 * | 9/2004 | Fazel et al. | 375/354 |
| 2006/0233288 A1 * | 10/2006 | Gruijters et al. | 375/343 |

FOREIGN PATENT DOCUMENTS

| | | |
|---|---|---|
| EP | 1 710 967 A2 | 10/2006 |
| JP | 5-235927 A | 9/1993 |
| JP | 7-177126 A | 7/1995 |
| JP | 10-98459 A | 4/1998 |
| WO | 2006/075312 A2 | 7/2006 |

OTHER PUBLICATIONS

European Search Report dated Dec. 19, 2007, issued in corresponding European Patent Application No. 07006579.2.
Japanese Office Action dated Nov. 11, 2008, issued in corresponding Japanese Patent Application No. 2006-302625.

* cited by examiner

*Primary Examiner*—Chieh M Fan
*Assistant Examiner*—Jaison Joseph
(74) *Attorney, Agent, or Firm*—Westerman, Hattori, Daniels & Adrian, LLP

(57) ABSTRACT

In a receiving apparatus for receiving communication data from a transmitting apparatus, specific code patterns are inserted in the communication data at predetermined intervals. The receiving apparatus includes a first frequency difference measurement device for measuring a first frequency difference between a receiving clock of the receiving apparatus and a transmission clock provided to the communication data, based on one of the specific code patterns and another of the specific code patterns which is positioned later; and a frequency adjustment device for adjusting a frequency of the receiving clock based on the measured first frequency difference so that the frequency substantially coincides with a frequency of the transmission clock.

7 Claims, 13 Drawing Sheets

FIG. 8

FRAME HEAD MEASUREMENT POSITION

/801

| SUB WINDOW No. | 1 2 3 4 5 6 7 8 9 10 11 12 |
|---|---|
| NUMBER OF DETECTION EVENTS | 0 0 1 1 5 2 0 0 0 0 0 0 |

| VALUE IN HEAD PHASE REGISTER | 5 |
|---|---|
| REPETITIVE-PATTERN DETERIORATION DETECTION SIGNAL | 0 |

FIG. 9

MEASUREMENT-START POSITION

/901

| SUB WINDOW No. | 1 2 3 4 5 6 7 8 9 10 11 12 |
|---|---|
| NUMBER OF DETECTION EVENTS | 0 0 0 0 0 0 3 4 1 0 1 0 |

| VALUE IN MEASUREMENT-START PHASE REGISTER | 8 |
|---|---|
| REPETITIVE-PATTERN DETERIORATION DETECTION SIGNAL | 0 |

FIG. 10

MEASUREMENT-END POSITION

~1001

| SUB WINDOW No. | 1 2 3 4 5 6 7 8 9 10 11 12 | VALUE IN MEASUREMENT-END PHASE REGISTER | 7 |
|---|---|---|---|
| NUMBER OF DETECTION EVENTS | 0 0 0 0 0 2 4 2 1 0 0 0 | REPETITIVE-PATTERN DETERIORATION DETECTION SIGNAL | 0 |

FIG. 11

MEASUREMENT-END POSITION

~1101

| SUB WINDOW No. | 1 2 3 4 5 6 7 8 9 10 11 12 | VALUE IN MEASUREMENT-END PHASE REGISTER | 8 |
|---|---|---|---|
| NUMBER OF DETECTION EVENTS | 1 0 0 0 0 1 0 2 1 1 0 0 | REPETITIVE-PATTERN DETERIORATION DETECTION SIGNAL | 1 |

RECEIVING APPARATUS FOR PERFORMING FREQUENCY SYNCHRONIZATION USING SPECIFIC CODE PATTERN

BACKGROUND OF THE INVENTION

1. Field of the Invention

The present invention relates to a receiving apparatus for receiving data which is intermittently sent by a transmitting apparatus (e.g., a video imaging apparatus for transmitting each frame of image data which is generated serially by imaging).

Priority is claimed on Japanese Patent Application No. 2006-302625, filed Nov. 8, 2006, the content of which is incorporated herein by reference.

2. Description of the Related Art

Patent Document 1 discloses a technique relating to a wireless communication system in which data transmission is intermittently performed. In the disclosed technique, in the intermittently-performed data transmission (i.e., burst transmission), synchronization is established while a preamble, which is inserted on the head of the data, is received, and after the preamble period, holding of voltage output from a VCO (i.e., voltage-controlled oscillator) is performed so as to hold a clock phase.

Patent Document 1: Japanese Unexamined Patent Application, First Publication No. H07-177126.

SUMMARY OF THE INVENTION

The present invention provides a receiving apparatus for receiving communication data from a transmitting apparatus, wherein;

specific code patterns are inserted in the communication data at predetermined intervals, and the receiving apparatus comprises:

a first frequency difference measurement device for measuring a first frequency difference between a receiving clock of the receiving apparatus and a transmission clock provided to the communication data, based on one of the specific code patterns and another of the specific code patterns which is positioned later; and a frequency adjustment device for adjusting a frequency of the receiving clock based on the measured first frequency difference so that the frequency substantially coincides with a frequency of the transmission clock.

In a preferable example:

predetermined repetitive patterns are also inserted in the communication data at predetermined intervals, and the receiving apparatus further comprises:

a second frequency difference measurement device for measuring a second frequency difference between the receiving clock of the receiving apparatus and the transmission clock provided to the communication data, based on phase data with respect to the repetitive patterns; and the frequency adjustment device adjusts the frequency of the receiving clock based on at least one of the first frequency difference and the second frequency difference.

In this case, as a typical example, when the first frequency difference is equal to or less than a predetermined value, the frequency adjustment device adjusts the frequency of the receiving clock based on the second frequency difference.

In this case, preferably, the receiving apparatus further comprise:

an abnormal adjustment detection device for determining, based on the first frequency difference, whether the frequency of the receiving clock can be adjusted in a normal adjustment state, wherein:

when the abnormal adjustment detection device determines that the frequency of the receiving clock cannot be adjusted in the normal adjustment state while the frequency of the receiving clock is adjusted based on the second frequency difference, the frequency adjustment device switches the frequency adjustment of the receiving clock to the adjustment based on the first frequency difference.

In another typical example:

the second frequency difference measurement device includes:

an in-period frequency difference measurement device for measuring a third frequency difference between the receiving clock and the transmission clock, based on a phase difference between a first phase with respect to one of the repetitive patterns and a second phase with respect to another of the repetitive patterns which is positioned later; and an accumulated frequency difference measurement device for measuring a fourth frequency difference between the receiving clock and the transmission clock, based on a phase difference between a reference phase obtained by the first of the repetitive patterns on the head thereof and a measured phase with respect to another of the repetitive patterns which is positioned later; and the frequency adjustment device adjusts the receiving clock using the third frequency difference and the fourth frequency difference.

In another typical example, the receiving apparatus may further comprise:

an average computing device for computing an average control value obtained by averaging control values which were used for adjusting the frequency of the receiving clock, wherein:

the communication data is transmitted sequentially by unit parts;

when the frequency adjustment of the receiving clock, performed immediately before reception of one unit part of the communication data is completed, is executed based on the first frequency difference, the frequency adjustment device selects a control value set immediately before the reception of the one unit part is completed, as a control value used immediately after the reception of the one unit part; and when the frequency adjustment of the receiving clock, performed immediately before reception of the one unit part of the communication data is completed, is executed based on the second frequency difference, the frequency adjustment device selects the average control value as the control value used immediately after the reception of the one unit part.

In another typical example, the receiving apparatus may further comprise:

a correlation detection device for operating a correlation between a reference pattern and one of the specific code patterns, and outputting a result of the operation as a correlation detection signal; and a specific-code-pattern deterioration measurement device for measuring a deterioration state of the received communication data, in accordance with a temporal width in which a state of the correlation detection signal is detected, wherein:

when it is determined by the specific-code-pattern deterioration measurement device that a received signal of the communication data is deteriorated, the frequency adjustment device does not perform the frequency adjustment based on the first frequency difference.

In another typical example, the receiving apparatus may further comprise:

a repetitive-pattern deterioration measurement device for measuring a deterioration state of the received communication data, in accordance with dispersion in positions with respect to a predetermined change point in each repetitive pattern, wherein:

when it is determined by the repetitive-pattern deterioration measurement device that a received signal of the communication data is deteriorated, the frequency adjustment device does not perform the frequency adjustment based on the second frequency difference.

In another preferable example, the receiving apparatus may further comprise:

a second frequency difference measurement device for outputting a second frequency difference between the receiving clock of the receiving apparatus and the transmission clock provided to the communication data, based on data which indicates a position where polarity of a signal of the communication data is changed, wherein the position is separate from positions of the specific code patterns, wherein:

the frequency adjustment device adjusts the frequency of the receiving clock based on at least one of the first frequency difference and the second frequency difference.

The present invention also provides a receiving apparatus for receiving communication data from a transmitting apparatus, wherein;

the communication data is transmitted periodically by unit parts, wherein in each unit part, a specific code pattern is provided on the head thereof, and the receiving apparatus comprises:

a measurement device for measuring a period for periodically receiving the specific code pattern by using a receiving clock of the receiving apparatus; and a frequency adjustment device for adjusting a frequency of the receiving clock based on a result of the measurement performed by the measurement device, so that the frequency substantially coincides with a frequency of a transmission clock provided to the communication data.

BRIEF DESCRIPTION OF THE DRAWINGS

FIG. 8 is a diagram for explaining the operation of the fine adjustment in the first embodiment.

FIG. 9 is also a diagram for explaining the operation of the fine adjustment.

FIG. 10 is also a diagram for explaining the operation of the fine adjustment.

FIG. 11 is also a diagram for explaining the operation of the fine adjustment.

DETAILED DESCRIPTION OF THE INVENTION

Hereinafter, embodiments in accordance with the present invention will be described with reference to the appended figures.

First Embodiment

A first embodiment of the present invention will be explained. The present embodiment is implemented by applying the present invention to a receiving apparatus used in an image communication system for intermittently transmitting each frame of image data obtained by imaging.

Figure 1:
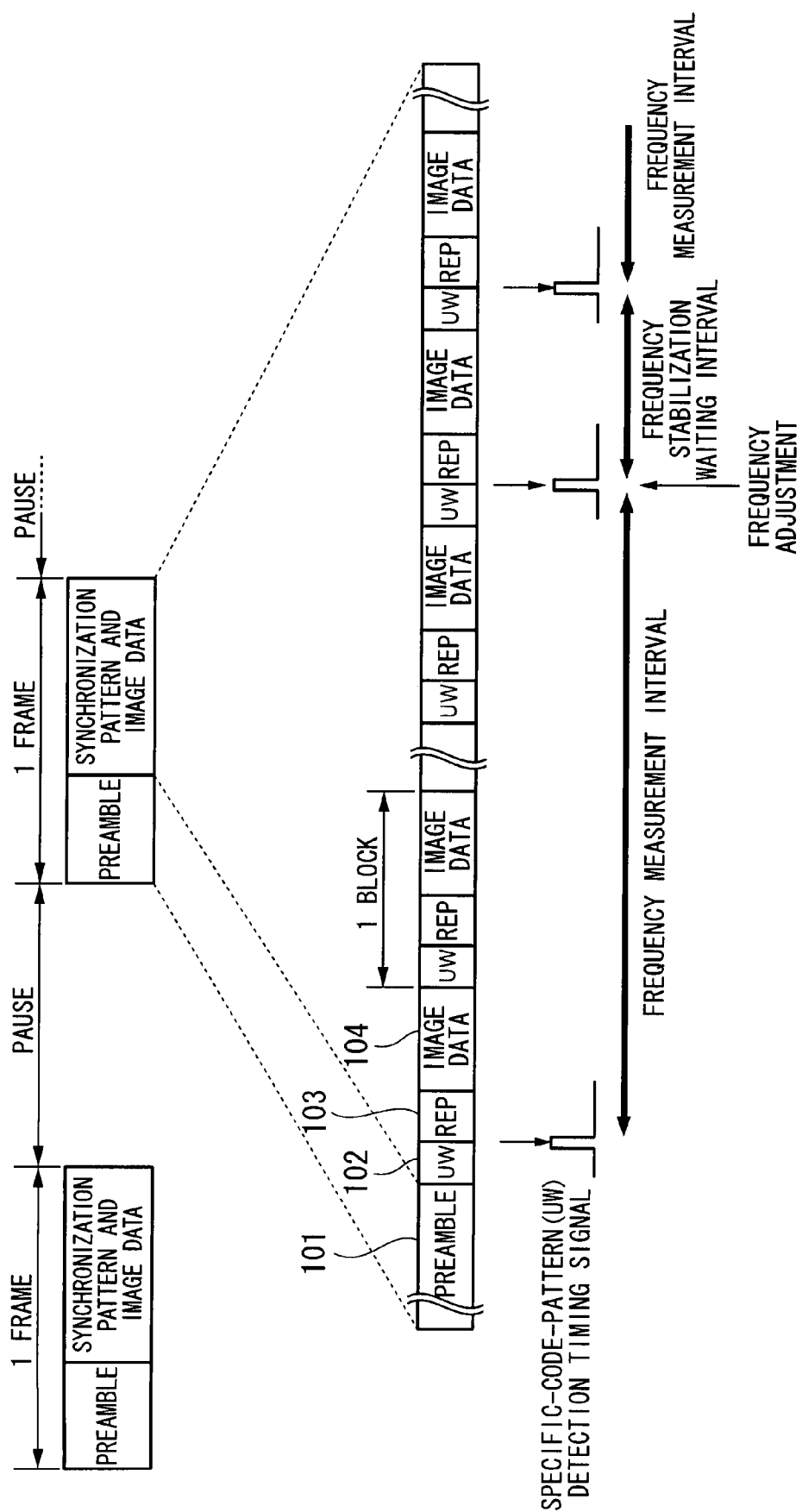
FIG. 1 is a diagram showing the frame structure of communication data and the method of measuring a frequency difference by using a specific code pattern in a first embodiment of the present invention.

FIG. 1 is a diagram showing the structure of communication data and the method of measuring a frequency difference in the present embodiment. As shown in FIG. 1, image data is communicated by each frame (i.e., unit data), and communication is intermittently performed by providing a pause between adjacent frames.

The image data in each frame is divided into a plurality of image data parts 104, each having a specific amount. A preamble 101 is appended to the head of each frame, and to the preamble 101, a plurality of blocks are added, where each block consists of a specific code pattern 102 (i.e., "UW (unique word)"), a repetitive pattern 103 ("REP" in FIG. 1) in which "0" and "1" are alternately repeated, and the image data part 104.

The preamble of the present embodiment is used only for detecting the starting of communication and stabilizing the operation of a high-frequency processing circuit, and thus has a shorter period in comparison with a preamble used in a communication system which establishes synchronization during the preamble.

The specific code pattern 102 is a predetermined data pattern which does not appear in image data, and is inserted in the communication data at specific intervals (equivalent intervals in the present embodiment).

In the present embodiment, the communication data is subjected to a correlation operation using the specific code pattern, so as to detect the specific code pattern provided to the communication data.

In the correlation operation of the present embodiment, sampling of the communication data is performed using a reference clock having a frequency which is an integer multiple of the data rate of the present system, and a result of the sampling is compared with the specific code pattern. In the correlation operation, when the communication data has a part which completely coincides with the specific code pattern, a specific-code-pattern detection timing signal is set on (i.e., set to a high level "HI"). As shown in FIG. 1, the timing at which the last bit of the specific code pattern UW is received is set as a timing at which the specific code pattern is detected.

Next, a frequency adjustment operation (i.e., frequency synchronization) will be explained. In the frequency adjustment operation, a frequency difference between a transmission clock with respect to the communication data and the reference clock of the receiving apparatus is measured, and the frequency of the reference clock is adjusted so that it synchronizes with the frequency of the transmission clock.

In the present embodiment, both of (i) frequency adjustment using the specific code pattern (called "rough adjustment") and (ii) frequency adjustment using the repetitive pattern (called "fine adjustment") are possible. First, the rough adjustment using the specific code pattern will be explained.

In the first step, an interval between two detection points of the specific-code-pattern detection timing signal, which interpose a predetermined "frequency measurement interval", is measured using the reference clock, so as to measure a phase difference. A concrete method of detecting the phase difference will be explained later in detail. The measured phase difference is then divided by the frequency measurement interval, thereby obtaining the frequency difference. The frequency adjustment of the reference clock is performed based on the obtained frequency difference.

Specifically, the frequency adjustment of the reference clock is performed by adjusting a control signal, which is supplied to a reference clock transmitter (which may include a voltage-controlled oscillation circuit), so that the frequency difference becomes (substantially) zero. After the adjustment of the control signal, measurement of the frequency difference is again started when the output frequency of the reference clock transmitter has stabilized (see "frequency stabilization waiting interval" in FIG. 1). FIG. 1 shows a sequence of frequency difference measurement (based on the frequency measurement interval)→frequency adjustment→frequency stabilization waiting.

Below, the method of measuring the frequency difference, using the specific code pattern, will be explained in more detail. In the first step, a first specific code pattern is detected. After a predetermined number of blocks (which correspond to the frequency measurement interval) have passed, the next specific code pattern is detected. Simultaneously, the time period between the first specific code pattern and the next specific code pattern is counted based on the reference clock of the receiving apparatus, so as to obtain a pattern interval count value.

In the next step, a predetermined reference count value which corresponds to the frequency measurement interval is subtracted from the pattern interval count value, so as to obtain a phase difference generated within the frequency measurement interval. The phase difference is then divided by the measurement time period (corresponding to the frequency measurement interval), so as to measure the frequency difference between a transmission clock element in the communication data and the reference clock of the receiving apparatus.

In a concrete example, when (i) the frequency of the transmission clock is 60 MHz, (ii) the frequency measurement interval is 10 ms, and (iii) the frequency of the reference clock is 60.003 MHz, the pattern interval count value is "600030". As the reference count value is "600000", a phase difference of "30" is computed. This indicates that a frequency difference for causing a phase difference corresponding to 30 periods per 10 ms, that is, a frequency difference of 3000 Hz has occurred. In this case, the frequency adjustment is performed so that the frequency of the reference clock is decreased by 3000 Hz.

Figure 2:
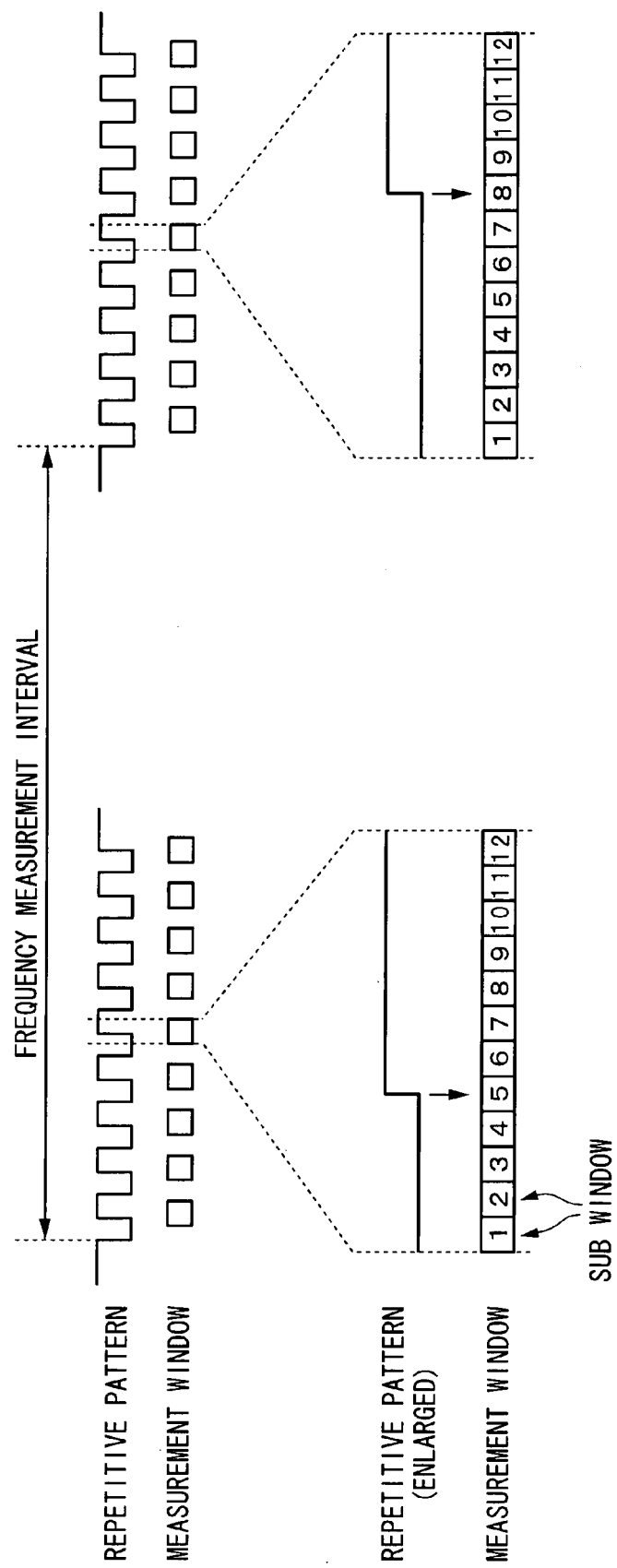
FIG. 2 is a diagram showing the method of measuring the frequency difference by using the repetitive pattern in the first embodiment.

Next, the method of adjusting the frequency using the repetitive pattern (i.e., the fine adjustment) will be explained. FIG. 2 is a diagram showing the method of measuring the frequency difference by using the repetitive pattern. The frequency difference measurement using the repetitive pattern is similar to the frequency difference measurement method as shown in FIG. 1 if the specific code pattern is substituted with the repetitive pattern. As shown in FIG. 2, in the repetitive pattern of the present embodiment, data of "0" (i.e., "LO") and data of "1" (i.e., "HI") are each repeated nine times.

In the present embodiment, after a predetermined time (i.e., the frequency measurement interval) has elapsed, an offset (corresponding to a phase difference) of a rising edge (i.e., a change point from "0" to "1") in the communication data is measured using a time which is generated based on the reference clock of the receiving apparatus, thereby obtaining a frequency difference between the transmission clock element in the communication data and the reference clock of the receiving apparatus. In the present embodiment, data of 1 bit (corresponding to single "0" or "1" in the repetitive pattern) is communicated within six transmission clock periods. Therefore, when the transmission clock and the reference clock coincide with each other, the above rising edge appears once within twelve transmission clock periods (which correspond to two bits from "0" to "1").

The position of the rising edge, which is detected within a period consisting of twelve reference clock periods, is fixed when the frequencies of the transmission clock and the reference clock coincide with each other. In contrast, when the frequencies of the transmission clock and the reference clock do not coincide with each other, the position of the rising edge changes in accordance with the amount of difference between the frequencies.

In order to measure the difference, the position of the rising edge is measured. More specifically, measurement windows and sub windows are used as shown in FIG. 2, where twelve sub windows are assigned to one measurement window. In each measurement window, a counter (common to all measurement windows) assigned to each sub window counts when the rising edge is detected in the relevant sub window. The position of the sub window having the maximum count value is determined as the position of the rising edge in the repetitive pattern. As shown in FIG. 2, nine measurement windows are provided in correspondence to nine rising edges in the repetitive pattern; thus, the upper limit of the maximum count value is 9 (that is, when the edge rises in the sub window at the same position (e.g., at the fifth sub window) in every measurement window, counting is performed nine times with respect to the sub window at the same position, and the count value of 9 is obtained).

The widths of each measurement window and each sub window (as a unit window for the measurement window) are not limited. If the widths are narrowed, the measurement accuracy is improved. However, in this case, when the jitter of the signal increases, dispersion in the position of the rising edge increases, which causes a trade-off such as a decrease in the maximum count value, and difficulty with the determination of the rising position. In the present embodiment, in consideration of such a trade-off, the frequency of the reference clock is doubled for the measurement.

The above-described measurement of the rising position with respect to the repetitive pattern is performed twice, before and after the frequency measurement interval (i.e., on both sides of the frequency measurement interval), and the difference between obtained rising positions is determined as a difference for the rising edge. In the measurement of the frequency difference, the repetitive pattern is measured at a desired time by the above-described method, so as to determine a measurement-start representative phase, and when the blocks corresponding to the frequency measurement interval have passed, the repetitive pattern is again measured so as to determine a measurement-end representative phase. The frequency difference is computed based on a difference between the measurement-start and measurement-end representative phases.

In a concrete example using numerical values, if (i) the frequency of the transmission clock is 60 MHz, (ii) the frequency measurement interval is 10 ms, (iii) the frequency of the reference clock is 60.00015 MHz (i.e., the frequency of the frequency-doubled clock is 120.0003 MHz), and (iv) the measurement-start representative phase "5" (see FIG. 2), then the measurement-end representative phase is "8" (5+((120.0003 MHz−(60 MHz×2))×10 ms). When the measurement-start representative phase "5" and the measurement-end representative phase "8" are measured as shown in FIG. 2, it indicates that there is a frequency difference for causing a phase difference corresponding to 1.5((8−5)/2) periods of the reference clock within 10 ms which is the frequency measurement interval, that is, a frequency difference of 150 Hz. In this case, frequency adjustment is performed so as to decrease the frequency of the reference clock by 150 Hz.

Next, the difference between the frequency difference measurement method using the specific code pattern and the frequency difference measurement method using the repetitive pattern will be explained.

In the frequency difference measurement method using the specific code pattern, no pattern which is the same as the specific code pattern appears in image data. Therefore, even when the difference between the transmission clock element in the communication data and the reference clock of the receiving apparatus is large, the frequency difference can be reliably measured. However, in order to detect the specific code pattern, coincidence should be established by performing the detection using the above-described correlation operation. Here, the detection timing is also shifted when the waveform of a received signal, which corresponds to a part of the specific code pattern, is disturbed due to a waveform distortion which occurs through the wireless communication. Therefore, in this measurement method, temporal accuracy tends to be degraded.

On the other hand, in the frequency difference measurement method using the repetitive pattern, when the difference between the transmission clock element in the communication data and the reference clock of the receiving apparatus is large, the rising edge may exceed the measurement window. In that case, the measurement cannot be executed. However, in this measurement method using the repetitive pattern, positions of a plurality of edges included in the data are directly measured, and each representative phase is selected through decision by majority; thus, it is possible to select the timing at which no signal deterioration occurs, so as to measure the frequency difference, thereby providing a high measurement accuracy.

In the present embodiment, the frequency difference measurement which uses the specific code pattern and has a wide measurement range, and the frequency difference measurement which uses the repetitive pattern and has a high measurement accuracy are selectively used in accordance with a synchronization state of the reference clock, so as to obtain both the wide measurement range and the high measurement accuracy.

Figure 3:
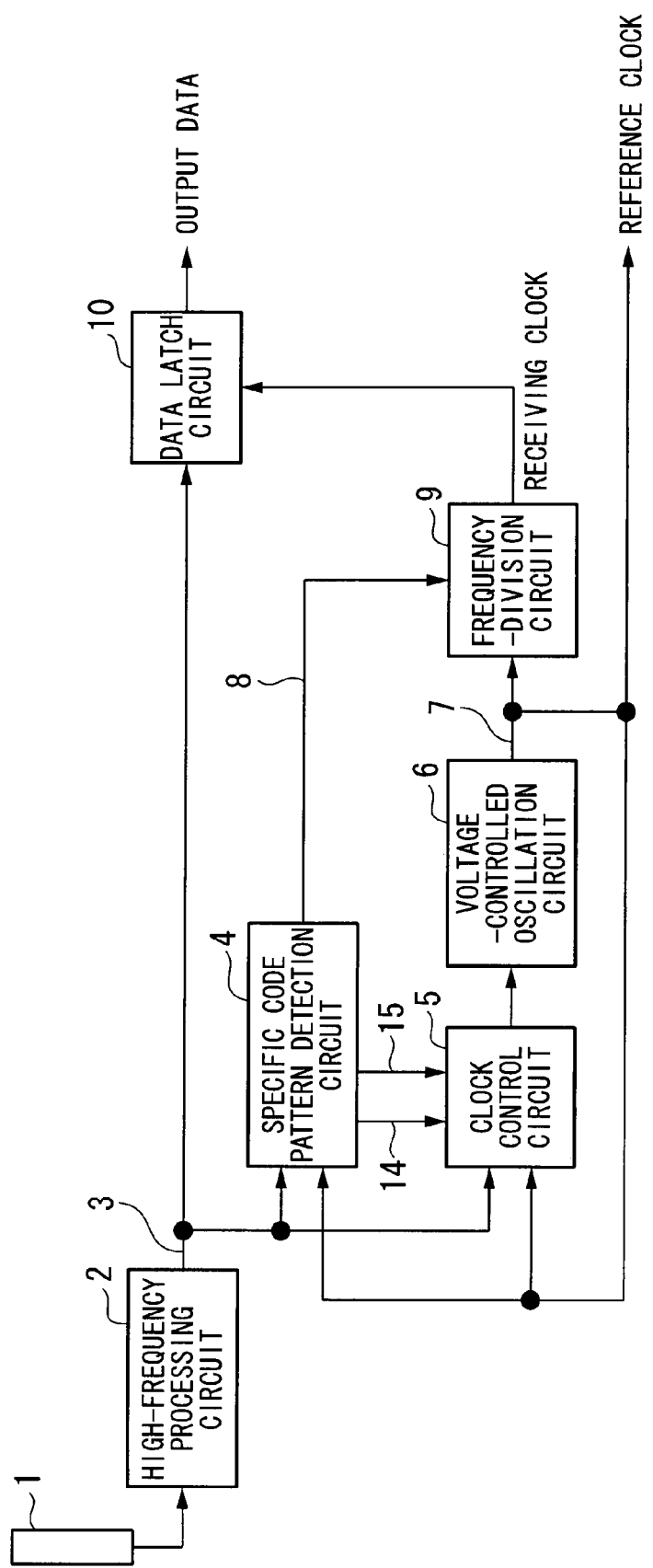
FIG. 3 is a diagram showing the structure of a receiving part in the receiving apparatus of the first embodiment.

Below, the structure of the receiving apparatus in the present embodiment will be explained. FIG. 3 shows the structure of a receiving (processing) part in the receiving apparatus. Each signal (i.e., communication data) received via an antenna 1 is converted by a high-frequency processing circuit 2 to received data 3 which is a binarized signal. The received data 3 is output to a specific code pattern detection circuit 4, a clock control circuit 5, and a data latch circuit 10.

The specific code pattern detection circuit 4 detects the specific code pattern included in the received data 3, and generates (i) a specific-code-pattern detection timing signal 15 and a specific-code-pattern deterioration detection signal 14, which are supplied to the clock control circuit 5, and (ii) a frequency-division circuit resetting signal 8 supplied to a frequency-division circuit 9, so as to correct the phase of a receiving clock. The specific-code-pattern detection timing signal 15 and the specific-code-pattern deterioration detection signal 14 will be explained later.

The frequency-division circuit 9 performs frequency division of a reference clock 7, which is generated by a voltage-controlled oscillation circuit 6, so as to generate the receiving clock, and performs a process of synchronizing the phase of the receiving clock, wherein the phase of the receiving clock is adjusted based on the frequency-division circuit resetting signal 8 supplied from the specific code pattern detection circuit 4.

The data latch circuit 10 latches onto the received data 3 output from the high-frequency processing circuit 2, and outputs the data to a succeeding circuit (not shown).

The clock control circuit 5 generates a control voltage applied to the voltage-controlled oscillation circuit 6 by using (i) the repetitive pattern in the received data 3, (ii) the specific-code-pattern detection timing signal 15 and the specific-code-pattern deterioration detection signal 14 supplied from the specific code pattern detection circuit 4, and (iii) the reference clock 7 generated by the voltage-controlled oscillation circuit 6, thereby performing frequency control so that there is no frequency difference between the transmission clock element in the communication data and the reference clock 7.

The reference clock 7 generated by the voltage-controlled oscillation circuit 6 is supplied, not only to the clock control circuit 5 and the frequency-division circuit 9, but also (as the system clock) to each part in the receiving apparatus. When the reference clock is used as the system clock, the received data can be easily received from the receiving part by a succeeding data processing part, thereby allowing simplification of the circuit.

Figure 4:
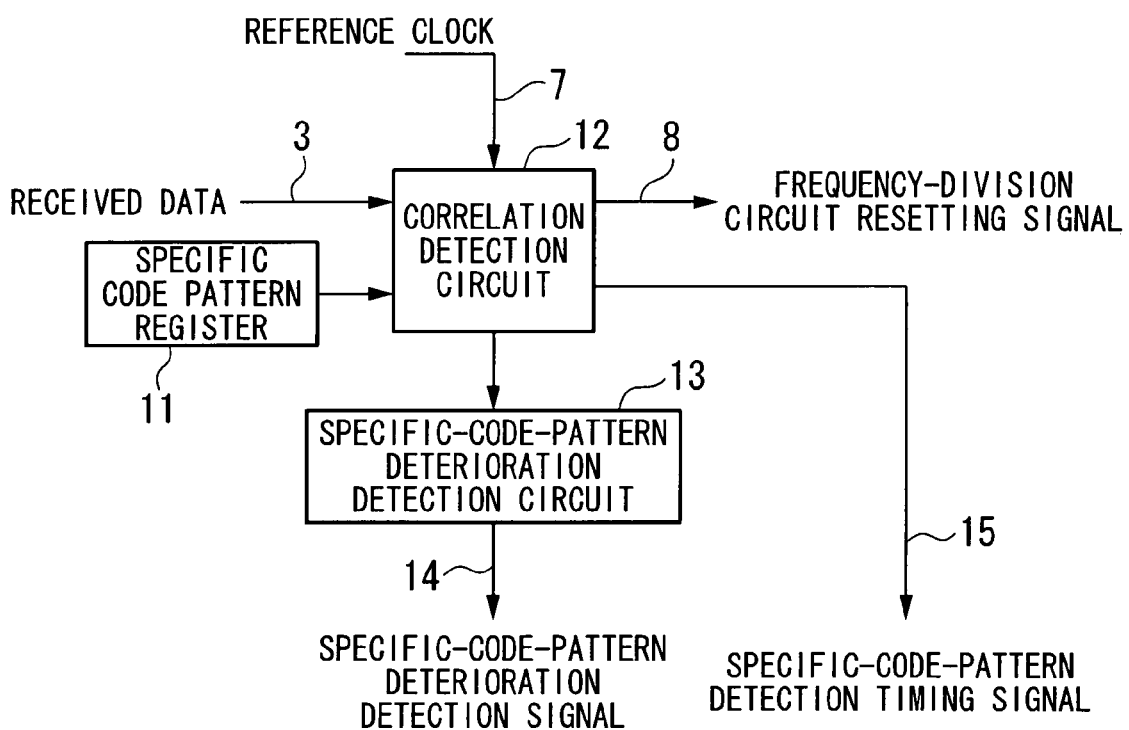
FIG. 4 is a diagram showing the structure of a specific code pattern detection circuit in the receiving apparatus of the first embodiment.

Next, the structure of the specific code pattern detection circuit 4 will be explained with reference to FIG. 4.

The received data 3 and data of the specific code pattern (i.e., specific code pattern data) supplied from a specific code pattern register 11 are input into a correlation detection circuit 12.

The correlation detection circuit 12 performs the correlation operation between the received data 3 and the specific code pattern data, and outputs a correlation detection signal, as a result of the correlation operation, to the specific-code-pattern deterioration detection circuit 13. Based on the result of the correlation operation, the correlation detection circuit 12 also generates (i) the specific-code-pattern detection timing signal 15 which indicates the reception timing of the specific code pattern in the received data 3, and (ii) the frequency-division circuit resetting signal 8 used for correcting the phase of the receiving clock.

In the correlation operation of the present embodiment, sampling of the communication data is performed using the reference clock 7, which has a frequency six times higher than the data rate of the communication data, and a result of the sampling is held during the data period of the specific code pattern data. The data held during the data period is compared with the specific code pattern data for every one reference-clock period, and data "1" is output only when the result of comparison indicates complete coincidence. More specifically, in the first step, sampling of the communication data is performed using the reference clock 7, and a result of the sampling is stored in a shift register.

In the present embodiment, the reference clock has a frequency six times higher than the data rate, and the size of the specific code pattern data is 30 bits. Therefore, the communication data is stored sequentially into a shift register having 180 steps. The shift register is sectioned for every 6 steps (corresponding to 1 bit), and data is output from each section of the shift register. Therefore, in the present embodiment, the total data output from each section of the shift register is 30 bits.

In the next step, the date output from each section of the shift register is compared with the specific code pattern data. In the comparison operation, the date output from each section of the shift register is compared by each bit with the specific code pattern data, and a correlation detection signal of "1" is output only when the data from the shift register completely coincides with the specific code pattern data with respect to all bits.

As described above, the sampling and the comparison operation with respect to the communication data are performed using the reference clock 7. Therefore, when there is no distortion in the communication data, the correlation detection signal of "1" is output during a period corresponding to six reference-clock periods. If a distortion corresponding to two (successive) reference-clock periods occurs in part of the specific code pattern in the communication data, no correlation is detected during the period in which the distortion occurs; thus, the correlation detection signal of "1" is output during a period corresponding to four reference-clock periods. That is, a distortion which occurs in the communication data influences the period of (continuously) outputting the correlation detection signal of "1", in accordance with a time period during which the distortion has occurred.

The specific-code-pattern deterioration detection circuit 13 detects deterioration in the communication data by using the above-described phenomenon in which the output period of the correlation detection signal of "1" is shortened when the communication data is deteriorated and a distortion occurs in the received data 3.

More specifically, the specific-code-pattern deterioration detection circuit 13 determines whether a detected output period of the correlation detection signal of "1" (i.e., a detected time width) is shorter than a predetermined period. When the output period of the correlation detection signal of "1" is shorter than the predetermined period, it is determined that the signal has deteriorated, and when the output period of the correlation detection signal of "1" is longer than or equal to the predetermined period, it is determined that the signal has not deteriorated. In accordance with the above-described process, the specific-code-pattern deterioration detection circuit 13 generates the specific-code-pattern deterioration detection signal 14 which indicates a state of signal deterioration when the specific code pattern is received, and outputs the signal 14 to the clock control circuit 5.

Figure 5:
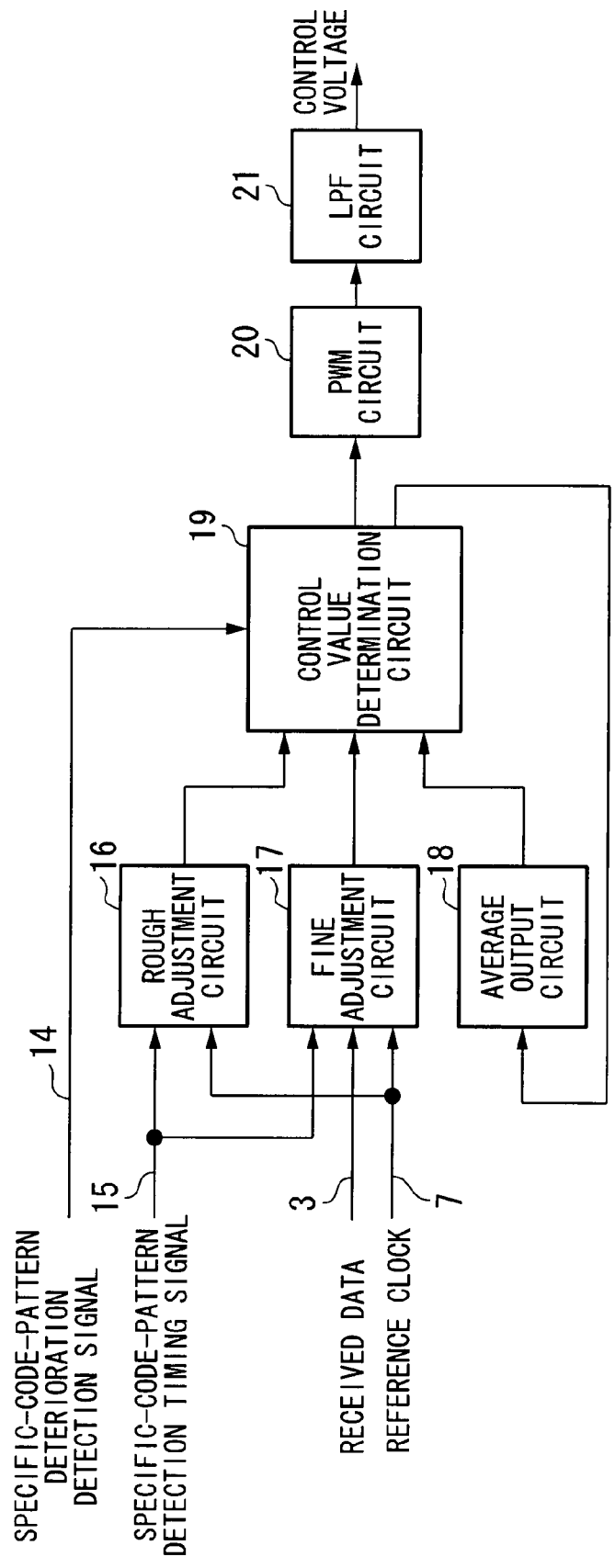
FIG. 5 is a diagram showing the structure of a clock control circuit in the receiving apparatus of the first embodiment.

Next, the structure of the clock control circuit 5 will be explained with reference to FIG. 5. A rough adjustment circuit 16 detects a frequency difference between the transmission clock element in the communication data and the reference clock of the receiving apparatus, by using the specific-code-pattern detection timing signal 15 input from the specific code pattern detection circuit 4. A fine adjustment circuit 17 detects the frequency difference between the transmission clock element in the communication data and the reference clock of the receiving apparatus, and also a state of signal deterioration when the repetitive pattern is received, by using the repetitive pattern included in the received data 3.

An average output circuit 18 stores the past eight frequency control values (i.e., control values used for adjusting the frequency of the reference clock) obtained in a fine adjustment (explained later), and generates an average of the eight values (i.e., an average control value).

A control value determination circuit 19 determines the frequency control value based on signals output from the rough adjustment circuit 16, the fine adjustment circuit 17, the average output circuit 18, and the specific-code-pattern deterioration detection signal 14.

The frequency control value from the control value determination circuit 19 is input into a PWM circuit 20. The PWM circuit 20 generates a PWM output signal whose duty ratio changes in accordance with the frequency control value, and outputs the PWM output signal into an LPF circuit 21. The LPF circuit 21 converts the input PWM output signal into an analog signal corresponding to the duty ratio, and outputs the analog signal as control voltage to the voltage-controlled oscillation circuit 6.

Figure 6:
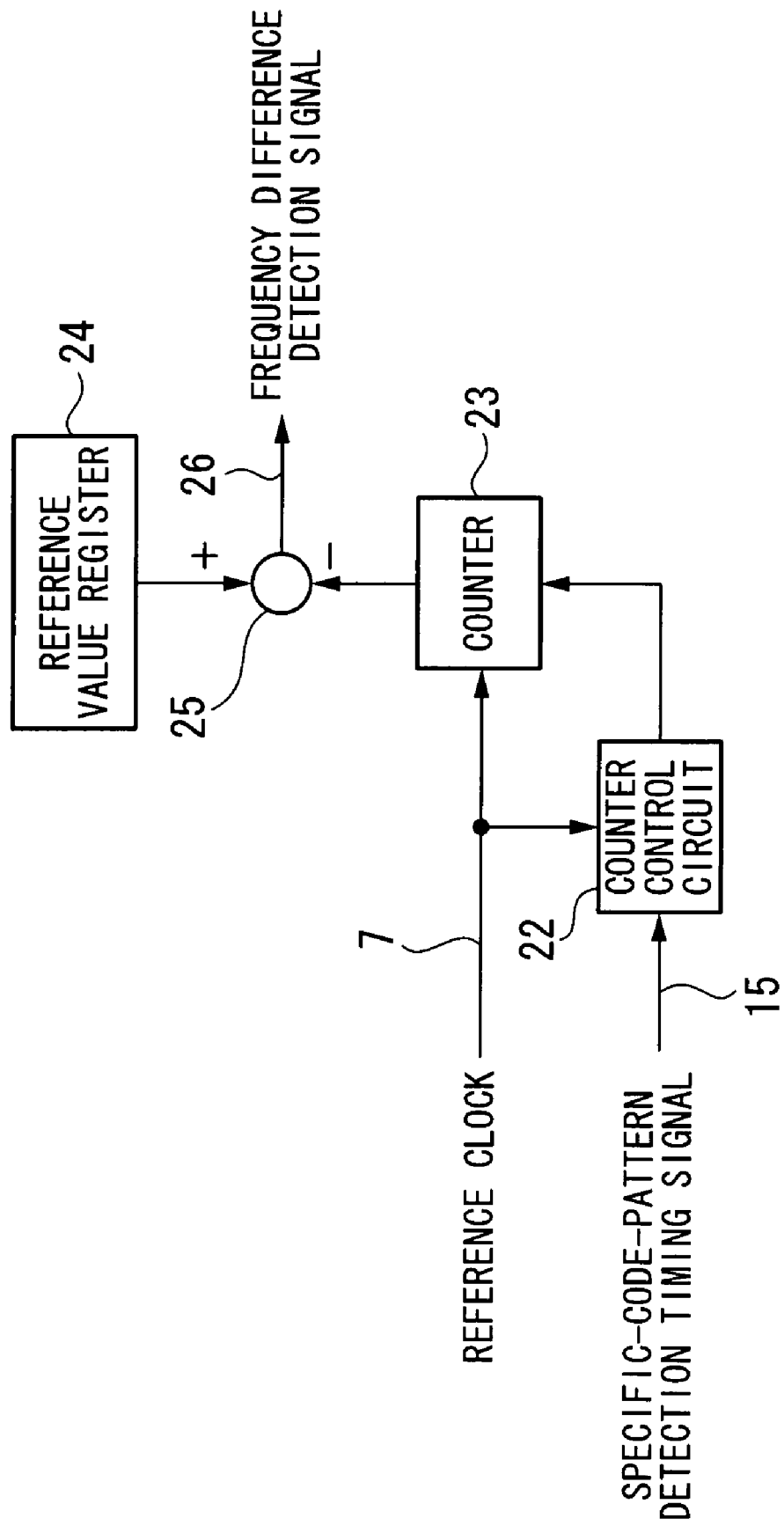
FIG. 6 is a diagram showing the structure of a rough adjustment circuit in the receiving apparatus of the first embodiment.

Next, the structure of the rough adjustment circuit 16 will be explained with reference to FIG. 6.

A counter 23 is used for measuring the detection interval of the specific code pattern. More specifically, the counter 23 measures by using the reference clock 7, a time period from the first detection of the specific code pattern to the next detection of the specific code pattern which occurs after a predetermined number of blocks (corresponding to the measurement time) have passed.

The counter 23 is controlled by a counter control circuit 22, to which the specific-code-pattern detection timing signal 15 is input. The counter control circuit 22 uses this specific-code-pattern detection timing signal 15 so as to start the counter 23 when the first specific code pattern is detected, and to stop the counter 23 when the specific code pattern is again detected after a specific time has elapsed.

In a reference value register 24, a reference count value is stored which is a value output from the counter 23 when there is no frequency difference between the transmission clock element in the communication data and the reference clock of the receiving apparatus. A frequency difference operation circuit 25 generates a frequency difference detection signal 26 by using the reference count value supplied from the reference value register 24 and the count value supplied from the counter 23, and outputs the signal 26 to the control value determination circuit 19 shown in FIG. 5. The control value determination circuit 19 performs frequency control so that the frequency difference detection signal 26 becomes substantially zero when the rough adjustment is performed, thereby synchronizing the frequency of the reference clock with the frequency of the transmission clock.

Next, the structure of the fine adjustment circuit 17 will be explained with reference to FIG. 7.

The fine adjustment is performed using both results of (i) frequency difference measurement in which the frequency difference using the repetitive pattern is performed in each measurement range within each frame of the communication data, and the frequency of the reference clock is adjusted so that the frequency difference becomes substantially zero, and (ii) accumulated frequency-difference measurement in which a phase difference with respect to the repetitive pattern between the head of a frame and each measurement position (i.e., an accumulated frequency difference) is measured, and the frequency of the reference clock is adjusted so that the phase difference (i.e., the accumulated frequency difference) becomes substantially zero.

Figure 7:
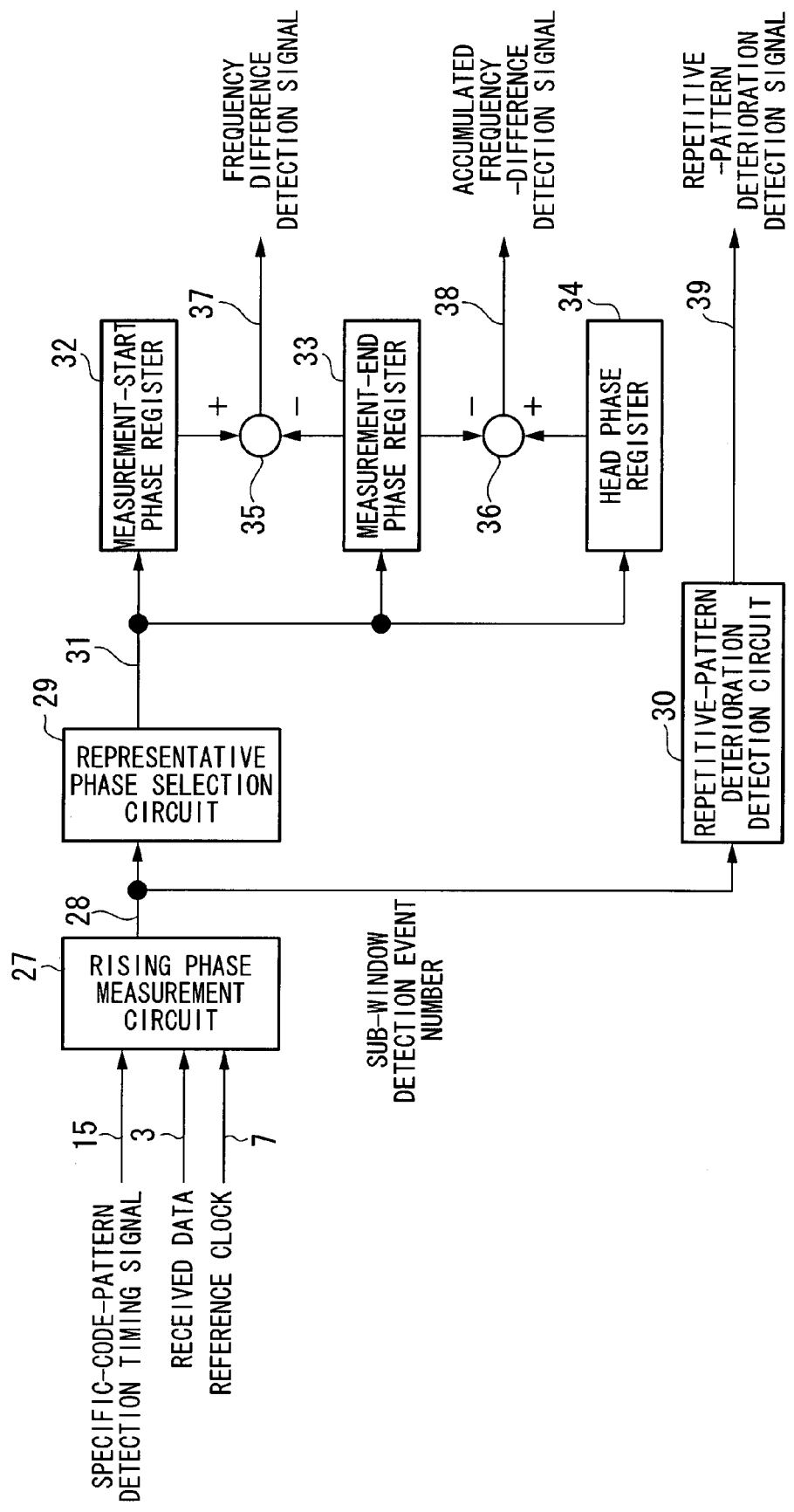
FIG. 7 is a diagram showing the structure of a fine adjustment circuit in the receiving apparatus of the first embodiment.

In FIG. 7, based on the received data 3, the reference clock 7, and the specific-code-pattern detection timing signal 15, a rising phase measurement circuit 27 measures the repetitive pattern in a desired block, and outputs the number of rising detection events of each sub window (obtained by the method which was explained with reference to FIG. 2), as a sub-window detection event number 28. Although it is not shown in the figure, the frequency-doubled clock used for measuring the rising position is generated by frequency-doubling the reference clock 7. The frequency-doubling process is well known, and thus explanation thereof is omitted.

A representative phase selection circuit 29 refers to the sub-window detection event number 28 assigned to each sub window, and selects the number of the sub window which obtained the maximum number of detection events. The representative phase selection circuit 29 then outputs the selected number as a representative phase value 31. This representative phase value 31 is stored in one of a head phase register 34, a measurement-start phase register 32, and a measurement-end phase register 33, in accordance with the measurement time point.

For example, when the repetitive pattern on the head of the frame is first measured, the measured value is stored in the head phase register 34 and the measurement-start phase register 32. When the next measurement is performed after the predetermined frequency measurement interval, the measured value is stored in the measurement-end phase register 33.

After the storage into the measurement-end phase register 33 is completed, a frequency difference operation circuit 35 generates a frequency difference detection signal 37 which corresponds to a phase difference in each frequency measurement period (corresponding to the frequency measurement interval), based on the values stored in the measurement-start phase register 32 and the measurement-end phase register 33. In addition, an accumulated frequency-difference operation circuit 36 generates an accumulated frequency-difference detection signal 38 which indicates a frequency difference corresponding to the phase difference between the head and the measurement-end position within the relevant frame, based on the value of the head phase register 34 (i.e., the value of the reference phase) and the value of the measurement-end phase register 33 (i.e., the value of the measured phase).

The content of the head phase register 34 does not change during the data transfer of each frame. In contrast, the content of the measurement-end phase register 33 is updated for each measurement. Therefore, the accumulated frequency-difference detection signal 38 corresponds to the phase difference between the head of the frame and each measurement position.

The control value determination circuit 19 performs the fine adjustment so that the frequency difference indicated by the frequency difference detection signal 37 and the frequency difference indicated by the accumulated frequency-difference detection signal 38 become substantially zero.

After the frequency adjustment by the control value determination circuit 19 is completed and a predetermined frequency stabilization period has passed, the next measurement is performed.

In the next measurement, the measurement result obtained for the measurement-start point is stored in the measurement-start phase register 32. When the predetermined frequency measurement interval has passed, the next measurement is performed, and the measured value is stored in the measurement-end phase register 33. The control value determination circuit 19 then performs the frequency adjustment again. The operation of the control value determination circuit 19 will be explained later in detail.

A repetitive-pattern deterioration detection circuit 30 measures signal deterioration by determining how many times the phase, which is selected as the representative phase value, has been detected. In the present embodiment, when the representative phase value has been detected four or more times, it is determined that the signal has not deteriorated. The repetitive-pattern deterioration detection circuit 30 outputs a repetitive-pattern deterioration detection signal 39 in accordance with a deterioration state of the signal (i.e., the signal 39 has a value of "1" when there is signal deterioration, or a value of "0" when there is no signal deterioration). The above-described series of operations is performed periodically until the end of the frames.

Below, the operation of the fine adjustment circuit 17 will be explained with reference to FIGS. 8 to 11, with respect to the first case in which the waveform of the received data 3 is normal, and the second case in which an error has occurred in the received data 3.

First, with reference to FIGS. 8 to 10, operations of the rising phase measurement circuit 27, the representative phase selection circuit 29, and the repetitive-pattern deterioration detection circuit 30 in the fine adjustment circuit 17 will be explained with respect to the first case in which the waveform of the received data 3 is normal.

FIG. 8 is a diagram showing an example of results of the repetitive-pattern detection on the head of a frame. Similarly, FIG. 9 is a diagram showing an example of results of the repetitive-pattern detection at a measurement-start position which is not the head of a frame, and FIG. 10 is a diagram showing an example of results of the repetitive-pattern detection at a measurement-end position.

In FIG. 8, a table 801 shows the number of detection events (for rising edges in the repetitive pattern) in each sub window on the head of the frame. In FIG. 8, among 12 sub windows, the sub window No. 5 has the maximum number of detection events, and the number of detection events is 5. In this case, the representative phase selection circuit 29 outputs "5", which is stored in the head phase register 34.

In FIG. 8, the number of detection events (for the rising edge) which occurred in the sub window No. 5 is 5; thus, the repetitive-pattern deterioration detection circuit 30 determines that the signal has not deteriorated. Accordingly, the repetitive-pattern deterioration detection circuit 30 outputs "0" as the repetitive-pattern deterioration detection signal 39.

Similarly, in a table 901 in FIG. 9, the number of counts for the sub window No. 8, which corresponds to the representative phase value "8", is 4; thus, it is determined that the signal has not deteriorated. Accordingly, "8" is stored in the measurement-start phase register 32, and the repetitive-pattern deterioration detection circuit 30 outputs "0" as the repetitive-pattern deterioration detection signal 39.

Also in a table 1001 in FIG. 10, the number of counts for the sub window No. 7, which corresponds to the representative phase value "7", is 4; thus, it is determined that the signal has not deteriorated. Accordingly, "7" is stored in the measurement-end phase register 33, and the repetitive-pattern deterioration detection circuit 30 outputs "0" as the repetitive-pattern deterioration detection signal 39.

Next, with reference to FIG. 11, operations of the rising phase measurement circuit 27, the representative phase selection circuit 29, and the repetitive-pattern deterioration detection circuit 30 in the fine adjustment circuit 17 will be explained with respect to the second case in which the waveform of the received data 3 has deteriorated. FIG. 11 shows an example in which signal deterioration occurs during the measurement of the "end position". When the signal deterioration occurs, detection positions of nine rising edges included in the repetitive pattern disperse, or the rising edge is not detected. In such a case, the maximum value of each sub-window detection event number 28 is under a predetermined value.

FIG. 11 shows a state in which the rising-edge detection positions disperse due to signal deterioration, and three edges cannot be detected. In a table 1101 in FIG. 11, the number of counts for the sub window No. 8, which corresponds to the representative phase value "8", is 2, which is smaller than the predetermined value (4); thus, it is determined that the waveform of the received data 3 has deteriorated. Accordingly, "8" is stored in the measurement-end phase register 33, and the repetitive-pattern deterioration detection circuit 30 outputs "1" as the repetitive-pattern deterioration detection signal 39.

Below, the operation of the control value determination circuit 19 in the clock control circuit 5 shown in FIG. 5 will be explained with reference to FIG. 12. As shown in FIG. 5, the control value determination circuit 19 generates the frequency control value based on the signals output from the specific code pattern detection circuit 4, the rough adjustment circuit 16, the fine adjustment circuit 17, and the average output circuit 18, and outputs the frequency control value to the PWM circuit 20.

When the frequency difference between the transmission clock element in the communication data and the reference clock of the receiving apparatus is large, the control value determination circuit 19 performs the rough adjustment using the signal supplied from the rough adjustment circuit 16. When the frequency difference between the transmission clock element in the communication data and the reference clock of the receiving apparatus is small, the control value determination circuit 19 performs the fine adjustment using the signal supplied from the fine adjustment circuit 17.

If the received signal deteriorates due to noise or the like while the rough adjustment is executed, then the present process of the rough adjustment is interrupted, and the frequency control value obtained immediately before the process interruption is output to the PWM circuit 20. On the other hand, if the received signal deteriorates due to noise or the like while the fine adjustment is executed, then the process of the fine adjustment is interrupted, and the value output to the PWM circuit 20 is generated using a signal (which indicates the average before the process interruption) from the average output circuit 18.

In addition, when an abnormal state occurs in the frequency control of the fine adjustment, the abnormal state is detected by monitoring the signal from the rough adjustment circuit 16 which is simultaneously operating. When the abnormal state is detected, the fine adjustment is terminated, and the rough adjustment is made active.

Below, the operation of the control value determination circuit 19 will be explained for each step shown in FIG. 12.

When the start of operation is commanded (see step S40), initial setting is performed (see step S41), and the values of each register and the output values are set to default values.

Next, the rough adjustment is performed, and the process of waiting for completion of the rough-adjustment measurement is performed (see step S42). In this process, the control value determination circuit 19 is waiting until the frequency difference detection signal 26 is output from the rough adjustment circuit 16 shown in FIG. 6. When the frequency difference detection signal 26 is output from the rough adjustment circuit 16, the process of waiting for completion of the rough-adjustment measurement (see step S42) is terminated, and an adjustment-state judgment is performed (see step S43).

In the adjustment-state judgment of step S43, when the output value from the rough adjustment circuit 16, which indicates the frequency difference, is smaller than or equal to a predetermined value, it is determined that the frequency difference is small and thus it is possible to shift to the fine adjustment. Generally, when the rough adjustment is executed for the first time, a frequency difference before the adjustment appears; thus, it is determined that it is impossible to shift to the fine adjustment.

When it is determined that it is impossible to shift to the fine adjustment, a specific-code-pattern deterioration judgment is performed, so as to determine the degree of signal deterioration when the specific code pattern is received (see step S44). The specific-code-pattern deterioration judgment of step S44 is performed based on the specific-code-pattern deterioration detection signal 14.

When it is determined that it is normal (i.e., no signal deterioration), setting of the rough adjustment value is performed (see step S45). In the setting of the rough adjustment value, the frequency control value is determined based on the frequency difference detection signal 26, and it is output to the PWM circuit 20.

As described above, in the PWM circuit 20, the determined frequency control value is converted into a PWM output signal whose duty ratio changes in accordance with the frequency control value, and this signal is applied as the control voltage via the LPF circuit 21 to the voltage-controlled oscillation circuit 6. Therefore, the frequency of the reference clock is adjusted in accordance with the frequency control value.

On the other hand, when it is determined in the specific-code-pattern deterioration judgment of step S44 that there is deterioration, the previous adjustment value (obtained in the last adjustment) is held (see step S46), so that the frequency difference detection signal 26 which indicates the result of the present measurement is disregarded, and the previous frequency control value is again output. Therefore, in this case, no frequency adjustment based on the frequency difference detection signal 26 is executed.

After the setting of the rough adjustment value (in step S45) or the holding of the previous adjustment value (in step S46) is performed, waiting for frequency stabilization is performed (see step S47). In this process of waiting for frequency stabilization, waiting until the operation (or the output frequency) of the voltage-controlled oscillation circuit 6 becomes stable is performed after the control value is changed. After the waiting for frequency stabilization, the operation returns to step S42 (i.e., the waiting for completion of rough-adjustment measurement), and the above-described operation loop is repeated.

On the other hand, when it is determined in the adjustment-state judgment of step S43 that it is possible to shift to the fine adjustment, waiting for completion of fine-adjustment measurement is performed (see step S49). In the waiting for completion of fine-adjustment measurement, the control value determination circuit 19 is waiting until the frequency difference detection signal 37 and the accumulated frequency-difference detection signal 38 are output from the fine adjustment circuit 17 shown in FIG. 7. When the frequency difference detection signal 37 and the accumulated frequency-difference detection signal 38 are output, the waiting for completion of fine-adjustment measurement is terminated, and a repetitive-pattern deterioration judgment is performed (see step S50).

The repetitive-pattern deterioration judgment of step S50 is performed based on the value of the repetitive-pattern deterioration detection signal 39. When the repetitive-pattern deterioration detection signal 39 shows "0", it is determined that there is no deterioration, and setting of fine adjustment value is performed (see step S51). The measurement for setting the fine adjustment is performed by the method which was shown when the operation of the fine adjustment circuit 17 (in FIG. 7) was explained. In the setting of fine adjustment value in step S51, the frequency control value is determined based on the frequency difference detection signal 37 and the accumulated frequency-difference detection signal 38 output from the fine adjustment circuit 17, and the determined frequency control value is output to the PWM circuit 20 and the average output circuit 18.

In the repetitive-pattern deterioration judgment of step S50, if the repetitive-pattern deterioration detection signal 39 shows "1", it is determined that there is deterioration, and an average output judgment is performed (see step S52).

In the average output judgment of step S52, the control value determination circuit 19 determines whether the value output from the average output circuit 18 is effective. The average output circuit 18 outputs the average of the frequency control values obtained in the past eight executions of the fine adjustment. In the average output judgment (of step S52) of the present embodiment, it is determined whether the control value output due to the fine adjustment has been performed eight or more times.

When the control value output due to the fine adjustment has been performed eight or more times, average output is performed in which the value output from the average output circuit 18 is output to the PWM circuit 20 and the average output circuit 18 (see step S53). When the control value output due to the fine adjustment has been performed less than eight times, holding of the previous adjustment value is performed, in which the frequency control value (obtained in the last adjustment) is output to the PWM circuit 20 and the average output circuit 18 (see step S54). This step is performed so as not to output an inappropriate value when the signal deterioration occurs in the seventh or less measurement after the measurement mode is shifted to the fine adjustment.

After one of the setting of fine adjustment value (in step S51), the average output (in step S53), and the holding of the previous adjustment value (in step S54) is performed, waiting for frequency stabilization is performed (see step S55).

In this process of waiting for frequency stabilization, waiting until the operation (or the output frequency) of the voltage-controlled oscillation circuit 6 becomes stable is performed after the control value is changed. After the waiting for frequency stabilization, an abnormal adjustment judgment is performed (see step S48).

In this process of abnormal adjustment judgment, the control value determination circuit 19 monitors the state of frequency control which is performed using the fine adjustment circuit 17, based on the frequency difference detection signal 26 supplied from the rough adjustment circuit 16.

As described above, the frequency measurement range is narrow in the fine adjustment; thus, when a frequency difference which exceeds the measurement range occurs, a measurement error occurs, which may cause repetition of erroneous control. In order to prevent such a situation, the frequency measurement using the rough adjustment circuit 16 is executed even during the fine adjustment, and the control value determination circuit 19 monitors whether the frequency difference appearing in the frequency difference detection signal 26 is normal.

When a state in which the frequency difference appearing in the frequency difference detection signal 26 exceeds a permissive range has continued for a predetermined time period or longer, it is determined in step S48 (i.e., the abnormal adjustment judgment) that the measurement state is abnormal, and the operation proceeds to step S42 (i.e., the waiting for completion of rough-adjustment measurement). That is, when it is detected that the frequency adjustment due to the fine adjustment cannot be executed in a normal state due to an abnormal frequency difference, the frequency adjustment is switched to the rough adjustment based on the frequency difference detection signal 26.

On the other hand, when the frequency difference appearing in the frequency difference detection signal 26 is within the permissive range, it is determined in step S48 (i.e., the abnormal adjustment judgment) that the measurement state is normal, and the operation proceeds to step S49 (i.e., the waiting for completion of fine-adjustment measurement). After that, the above operation is repeated, and the frequency adjustment is executed.

The frequency adjustment during the pause after the data transfer of one frame is completed is performed as explained below.

When the data transfer is completed and the pause starts during the rough adjustment, the specific code pattern cannot be detected; thus, the waiting for completion of rough-adjustment measurement (in step S42) is continued during the pause. In that case, the value determined in the last setting of the rough adjustment (in step S45) is held as the frequency control value. That is, the frequency control value immediately before the pause is held and used.

On the other hand, when the data transfer is completed and the pause starts during the fine adjustment, the entrance into the pause is detected in the process of waiting for completion of fine-adjustment measurement (in step S49). In that case, the above-described average output judgment (in step S52) is executed, and the frequency control value during the pause of the data transfer is determined based on a result of the judgment. That is, when the average output is possible, the average is held and used as the frequency control value after the transfer of the communication data is terminated. On the other hand, when the average output is impossible, the previous frequency control value is held and used as the frequency control value after the transfer of the communication data is terminated.

As described above, in accordance with the present embodiment, the specific code pattern, which is periodically received, is used as a signal for frequency synchronization, so that the frequency synchronization can be more accurately performed in comparison with a conventional method in which the frequency synchronization is performed within a preamble. In addition, the length of the preamble can be reduced in the present embodiment; thus, increase in the amount of the communication data can be minimized, thereby performing efficient communication.

Additionally, both the frequency synchronization using the specific code pattern and the frequency synchronization using the repetitive pattern are selectively used; thus, the frequency difference can be easily and highly accurately measured in accordance with the situation. Furthermore, one of the rough adjustment having a wide measurement range and the fine adjustment having a high measurement accuracy is switchably used in accordance with the frequency difference; thus, it is possible to obtain both the wide measurement range and the high measurement accuracy.

In addition, the operation state of the fine adjustment having a high measurement accuracy is monitored based on the frequency difference detection signal 26 which is used for the rough adjustment having a wide measurement range, and the fine adjustment is switched to the rough adjustment when an abnormal frequency difference is detected. Accordingly, even when the fine adjustment circuit 17 erroneously operates due to noise or the like, and a frequency difference which exceeds the measurement range occurs, influence due to the erroneous operation can be minimized.

Additionally, during the reception of a series of data, the fine adjustment circuit 17 outputs (i) data for indicating the frequency difference for each specific period, and (ii) data for indicating the accumulated frequency difference between the head of the series of data and each measurement position, and the control value determination circuit 19 performs the frequency adjustment using both items of the output data. Therefore, synchronization accuracy of the receiving clock is increased.

Figure 12:
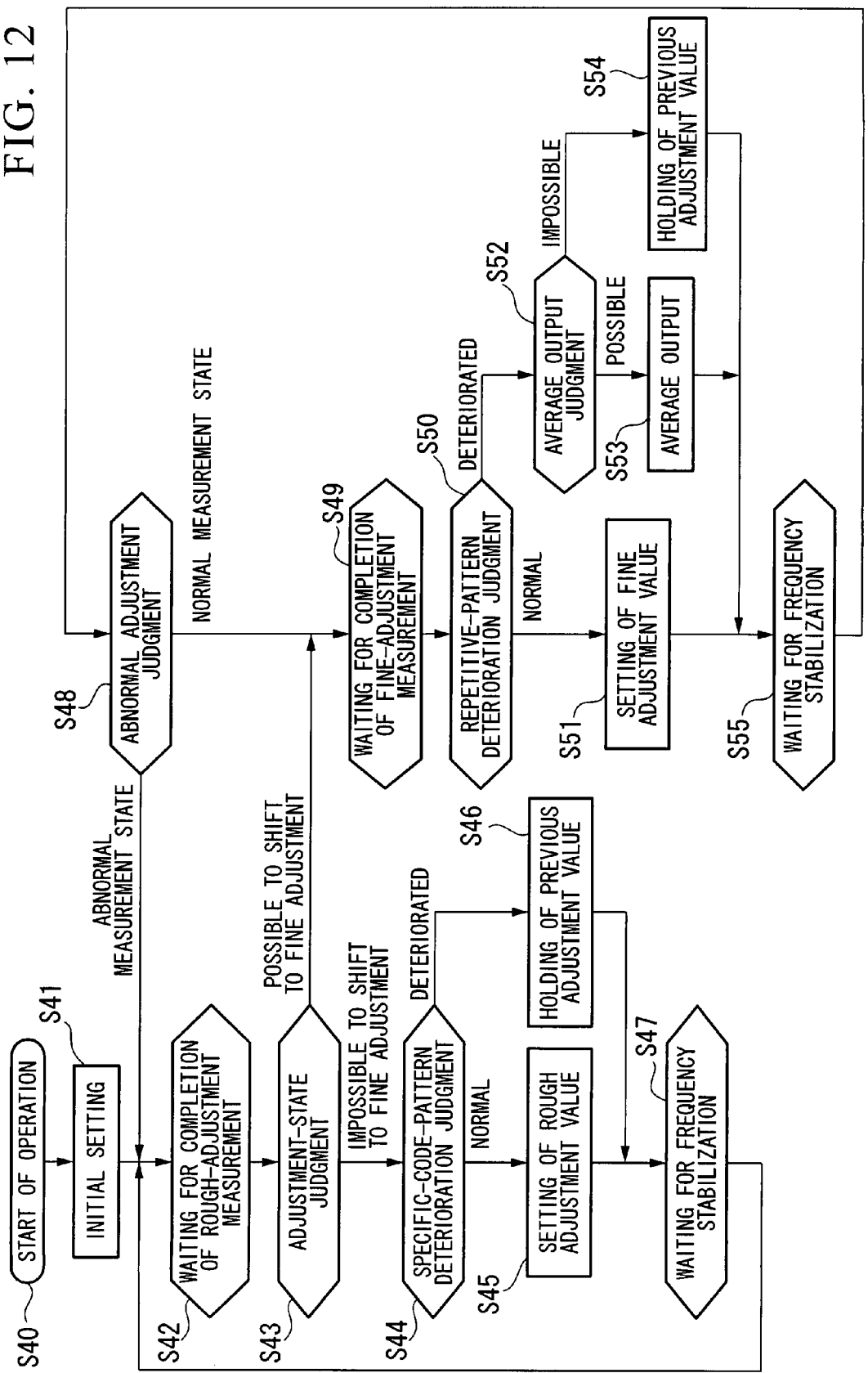
FIG. 12 is a flowchart showing the operation of the control value determination circuit in the clock control circuit of the first embodiment.

Furthermore, as explained using FIG. 12, when deterioration in the communication data is detected during the rough adjustment, the holding of the previous adjustment value (in step S46) is performed, and when deterioration in the communication data is detected during the fine adjustment, the average output judgment (in step S52) and one of the average output (in step S53) and the holding of the previous adjustment value (in step S54) are performed. Therefore, the frequency adjustment can be executed while avoiding a deteriorated communication state, thereby always allowing highly accurate frequency adjustment.

Second Embodiment

Figure 13:
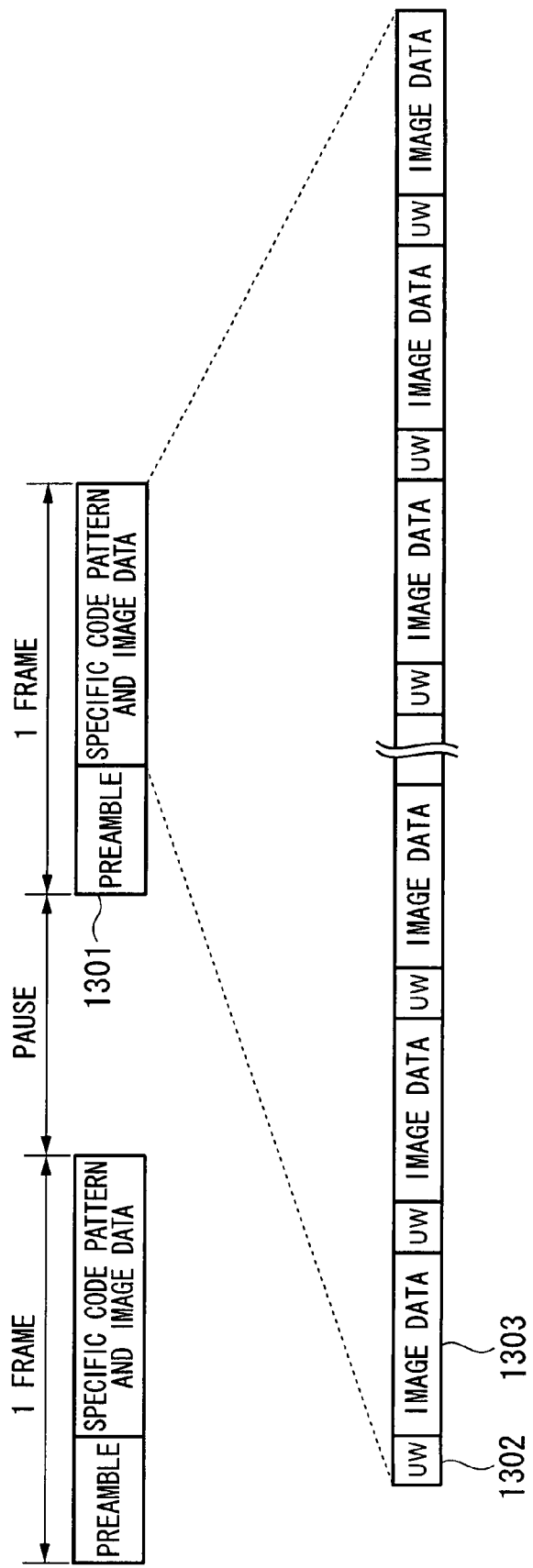
FIG. 13 is a diagram showing the frame structure of communication data in a second embodiment of the present invention.

A second embodiment of the present invention will be explained below. FIG. 13 is a diagram showing the structure of the communication data in the present embodiment. As shown in FIG. 13, a preamble 1301 is inserted on the head of each frame, and a specific code pattern 1302 (i.e., "UW (unique word)") is provided on the head of image data 1303 in each block as a specific divided unit. The communication data is transmitted by each frame. In contrast to the first embodiment, only the specific code pattern is provided on the head of each block in the present embodiment.

The receiving apparatus corresponding to the communication data which has the above-described structure may belong to one of two types: one having a receiving (processing) part for obtaining frequency data only by using the specific code pattern, so as to perform frequency adjustment, and the other having a receiving part for obtaining frequency data also in accordance with phase data of rising edges in image data.

First, the receiving part for obtaining frequency data only by using the specific code pattern will be explained. In this case, in the clock control circuit 5 of the first embodiment, the fine adjustment circuit 17 is omitted. Therefore, frequency adjustment is performed only through the rough adjustment; however, a desired frequency-measurement accuracy can be provided by increasing the frequency measurement period.

Next, the receiving part for obtaining frequency data in accordance with phase data of rising edges in the image data will be explained. In this case, in the clock control circuit 5 of the first embodiment, the function of the rising phase measurement circuit 27 in the fine adjustment circuit 17 is changed. More specifically, instead of the phase measurement with respect to the rising edge in the repetitive pattern of the first embodiment, the phase with respect to the rising edge in the image data is measured in the present embodiment.

Figure 14:
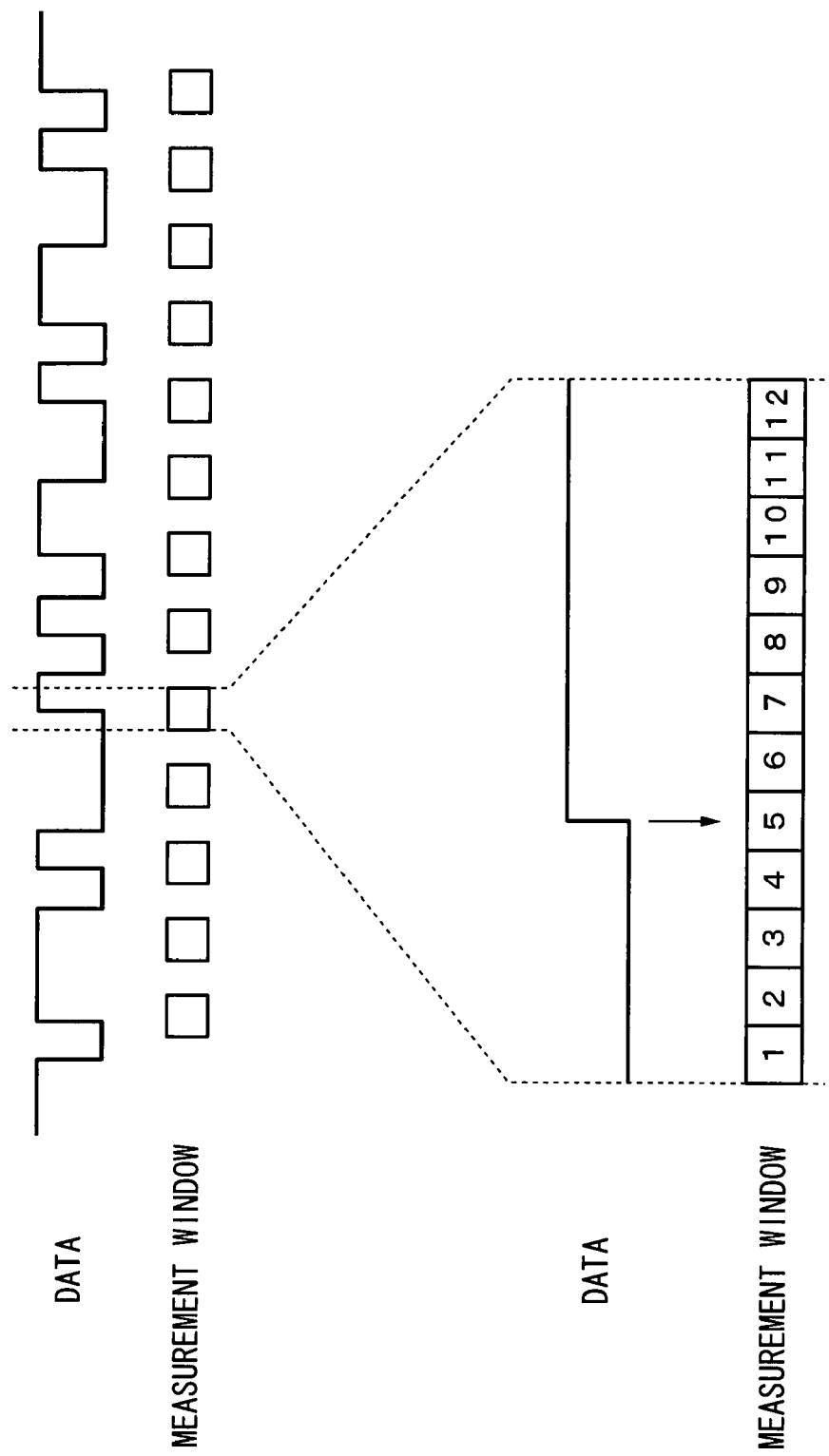
FIG. 14 is a diagram showing the method of measuring a frequency difference by measuring a rising phase of the communication data in the second embodiment.

FIG. 14 shows an example of the measurement. In contrast to the repetitive pattern, in the image data, each rising edge does not always appear with a fixed period. Therefore, the measurement windows (each having twelve sub windows, similar to the first embodiment) are not closed until nine rising edges have been detected. When nine rising edges have been detected, the phase measurement is completed, and the sub-window detection event number 28 for each sub window (see FIG. 7) is generated, and frequency adjustment is performed based on data of the generated signal. Here, original rising or falling positions in the data (i.e., each position where the signal should rise or fall originally, that is, the position where the polarity of data is changed) when the reference clock coincides with the transmission clock are known. Therefore, the frequency adjustment can be performed in accordance with an offset from the relevant original position.

In the above method, detection of signal deterioration during the fine adjustment is not performed. However, abnormal operation due to signal deterioration is prevented by strictly performing the abnormal adjustment judgment (corresponding to step S48 in FIG. 12) which is executed in the control value determination circuit 19. A concrete execution method in this case is similar to the frequency adjustment method explained in the first embodiment; thus, an explanation thereof is omitted.

In accordance with the present embodiment, the specific code pattern which is periodically received is used as a signal for the frequency synchronization, so that the frequency synchronization can be more accurately performed in comparison with a conventional method in which the frequency synchronization is performed within a preamble. In addition, the length of the preamble can be reduced in the present embodiment; thus, increase in the amount of the communication data can be minimized, thereby performing efficient communication.

In addition to the specific code pattern, the frequency difference can be measured by also using the phase with respect to the position where the polarity of data is changed. In this case, more accurate frequency adjustment can be performed in comparison with the frequency difference measurement using only the specific code pattern. Furthermore, when the frequency difference is measured using the phase with respect to the position where the polarity of data is changed, it is unnecessary to insert the specific code pattern or the repetitive pattern in the communication data. Therefore, highly accurate frequency adjustment can be performed without increasing the amount of communication data.

Third Embodiment

Figure 15:
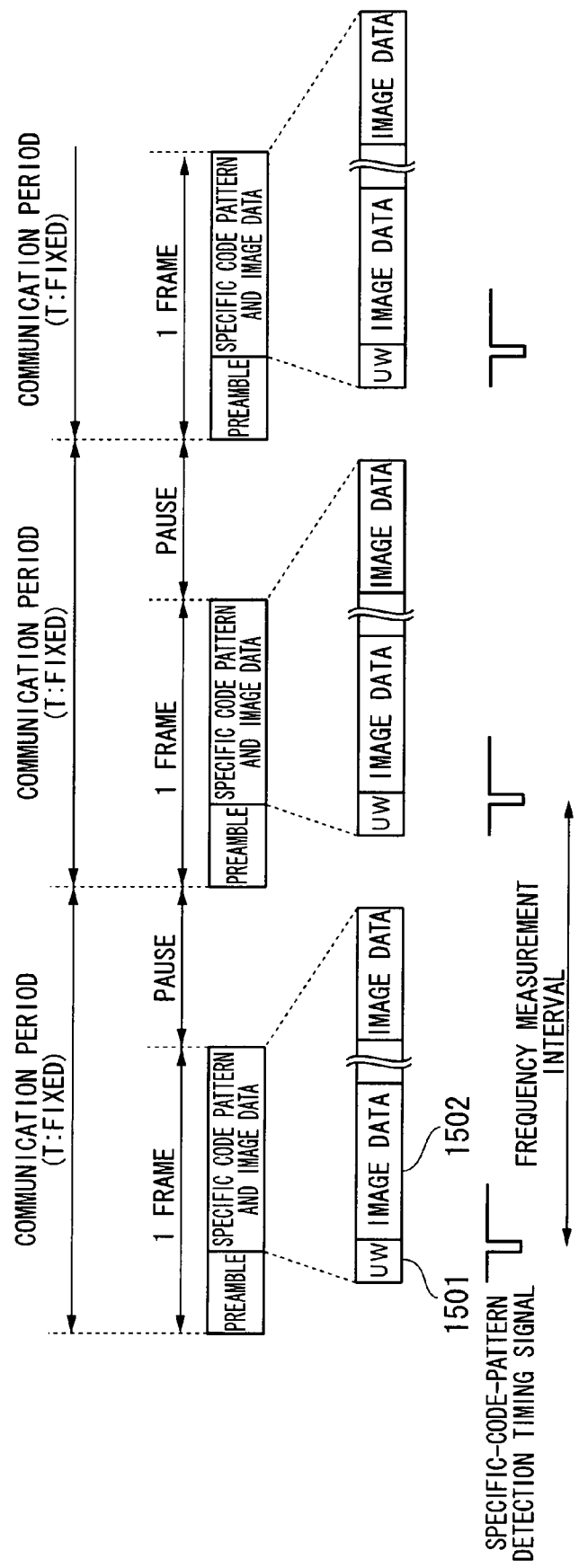
FIG. 15 is a diagram showing the frame structure of communication data in a third embodiment of the present invention.

A third embodiment of the present invention will be explained. FIG. 15 is a diagram showing the structure of the communication data in the present embodiment. Data of each (one) frame is transmitted with a fixed communication period (T), and at least one specific code pattern 1501 is provided to each frame, on the head of image data 1502, that is, immediately after the preamble.

The frequency adjustment is performed in a manner such that the period for (periodically) receiving the specific code pattern is measured using the reference clock of the receiving part, and the measured period is compared with a predetermined frame-transfer period so as to measure a frequency difference and adjust the reference clock so that the frequency difference is removed. A concrete execution method in this case is similar to the rough adjustment method explained in the first embodiment; thus, an explanation thereof is omitted.

In accordance with the present embodiment, the reception interval of the specific code pattern is measured using the clock of the receiving apparatus, and the reception interval is compared with a predetermined reception interval so as to measure the frequency difference, thereby minimizing the amount of code for measuring the frequency difference. Therefore, efficient communication can be performed while executing highly accurate frequency synchronization. In addition, periodically-performed communication is effectively used, that is, the reception interval is used as the frequency measurement interval, thereby providing a high frequency-measurement accuracy. Therefore, it is possible to perform highly accurate frequency synchronization.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

In accordance with the present invention, frequency synchronization is performed based on the detection results of one of the specific code patterns and another (or the succeeding one) of the specific code patterns, so that highly accurate frequency synchronization can be performed. In addition, the length of the preamble can be reduced, thereby minimizing the amount of increase in the communication data, and resulting in efficient communication.

What is claimed is:

1. A receiving apparatus for receiving communication data from a transmitting apparatus, wherein:
   a specific code pattern and a predetermined repetitive pattern which has a plurality of positions wherein the polarity of the repetitive pattern is changed are each inserted in the communication data at predetermined intervals;
   the receiving apparatus comprises:
      a first frequency difference measurement device for measuring a first frequency difference between a receiving clock of the receiving apparatus and a transmission clock provided to the communication data, based on a detection interval between the specific code pattern which is detected early, and the specific code pattern which is detected later;
      a second frequency difference measurement device for measuring a second frequency difference between the receiving clock of the receiving apparatus and the transmission clock provided to the communication data, based on phase data which is obtained in accordance with the positions where the polarity of the repetitive pattern is changed; and
      a frequency adjustment device for adjusting a frequency of the receiving clock based on at least one of the measured first frequency difference and the measured second frequency difference so that the frequency of the receiving clock substantially coincides with a frequency of the transmission clock; and
   when the first frequency difference is equal to or less than a predetermined value, the frequency adjustment device adjusts the frequency of the receiving clock based on the second frequency difference.

2. The receiving apparatus in accordance with claim 1, further comprising:
   an abnormal adjustment detection device for determining, based on the first frequency difference, whether the frequency of the receiving clock can be adjusted in a normal adjustment state, wherein:
   when the abnormal adjustment detection device determines that the frequency of the receiving clock cannot be adjusted in the normal adjustment state while the frequency of the receiving clock is adjusted based on the second frequency difference, the frequency adjustment device switches the frequency adjustment of the receiving clock to the adjustment based on the first frequency difference.

3. The receiving apparatus in accordance with claim 1, wherein:
   the second frequency difference measurement device includes:
      an in-period frequency difference measurement device for measuring a third frequency difference between the receiving clock and the transmission clock, based on a phase difference between a first phase with respect to the repetitive pattern, which is detected early, and a second phase with respect to the repetitive pattern which is detected later; and
      an accumulated frequency difference measurement device for measuring a fourth frequency difference between the receiving clock and the transmission clock, based on a phase difference between a reference phase obtained by the repetitive pattern which first appears as the head and a measured phase with respect to the repetitive pattern which is detected later; and
   the frequency adjustment device adjusts the receiving clock using the third frequency difference and the fourth frequency difference.

4. The receiving apparatus in accordance with claim 1, further comprising:
   an average computing device for computing an average control value obtained by averaging control values which were used for adjusting the frequency of the receiving clock, wherein:
   the communication data is transmitted sequentially by unit parts;
   when the frequency adjustment of the receiving clock, performed immediately before reception of one unit part of the communication data is completed, is executed based on the first frequency difference, the frequency adjustment device selects a control value set immediately before the reception of the one unit part is completed, as a control value used immediately after the reception of the one unit part; and
   when the frequency adjustment of the receiving clock, performed immediately before reception of the one unit part of the communication data is completed, is executed based on the second frequency difference, the frequency adjustment device selects the average control value as the control value used immediately after the reception of the one unit part.

5. The receiving apparatus in accordance with claim 1, further comprising:
   a correlation detection device for operating a correlation between a reference pattern and the specific code pattern, and outputting a result of the operation as a correlation detection signal; and a specific-code-pattern deterioration measurement device for measuring a deterioration state of the received communication data, in accordance with a temporal width in which a state of the correlation detection signal is detected, wherein:

when it is determined by the specific-code-pattern deterioration measurement device that a received signal of the communication data is deteriorated, the frequency adjustment device does not perform the frequency adjustment based on the first frequency difference.

6. The receiving apparatus in accordance with claim 1, further comprising:

a repetitive-pattern deterioration measurement device for measuring a deterioration state of the received communication data, in accordance with dispersion in a detection position for the positions where the polarity of the repetitive pattern is changed, wherein:

when it is determined by the repetitive-pattern deterioration measurement device that a received signal of the communication data is deteriorated, the frequency adjustment device does not perform the frequency adjustment based on the second frequency difference.

7. A receiving apparatus for receiving communication data from a transmitting apparatus, wherein:

a specific code pattern is inserted in the communication data at predetermined intervals;

the receiving apparatus comprising:

a first frequency difference measurement device for measuring a first frequency difference between a receiving clock of the receiving apparatus and a transmission clock provided to the communication data, based on a detection interval between the specific code pattern which is detected early, and the specific code pattern which is detected later;

a frequency adjustment device for adjusting a frequency of the receiving clock based on the measured first frequency difference so that the frequency of the receiving clock substantially coincides with a frequency of the transmission clock; and a second frequency difference measurement device for outputting a second frequency difference between the receiving clock of the receiving apparatus and the transmission clock provided to the communication data, based on data which indicates a position where polarity of a signal of the communication data is changed, wherein the position is separate from the position of the specific code pattern; and the frequency adjustment device adjusts the frequency of the receiving clock based on at least one of the first frequency difference and the second frequency difference, wherein when the first frequency difference is equal to or less than a predetermined value, the frequency adjustment device adjusts the frequency of the receiving clock based on the second frequency difference.

* * * * *